Patented May 15, 1945

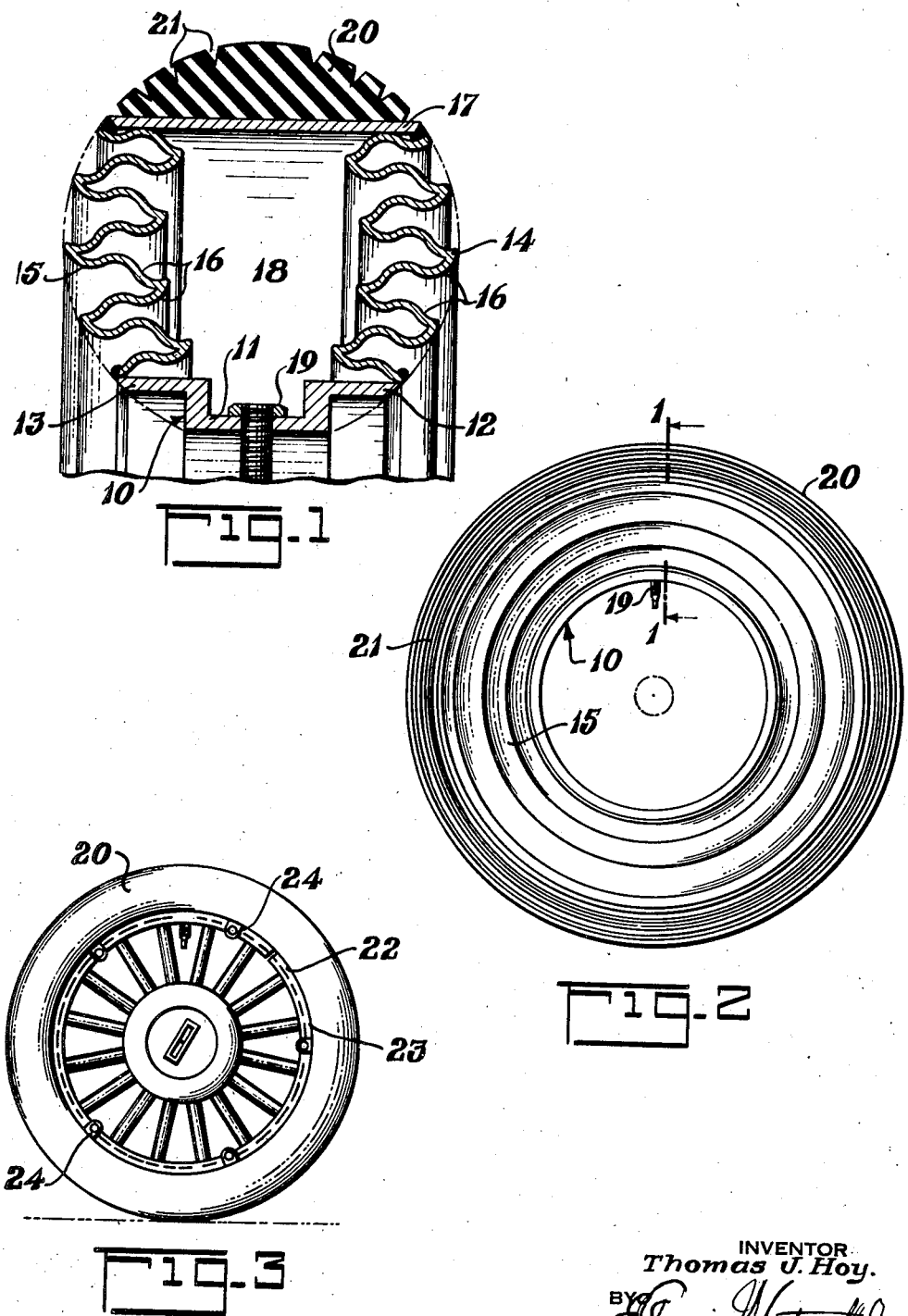

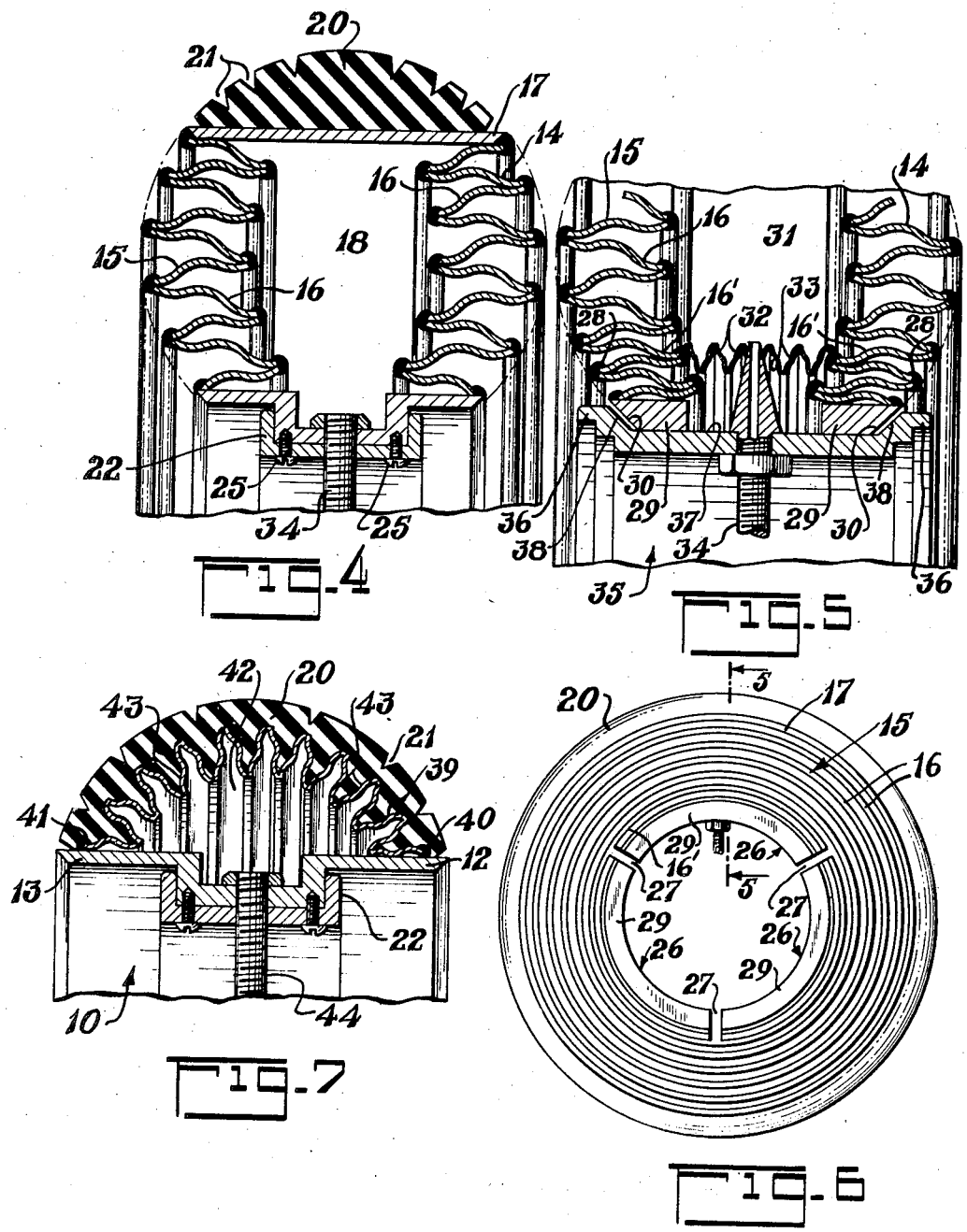

2,375,992

UNITED STATES PATENT OFFICE 2,375,992

TIRE CONSTRUCTION

Thomas J. Hoy, Newark, N. J.

Application March 3, 1942, Serial No. 433,125

18 Claims. (Cl. 152—156)

This invention relates to tires and more particularly to vehicle tires which afford a resilient and yielding contact with the road.

The present invention provides a tire which may readily be applied to a vehicle wheel which tire requires but a minimum expense in upkeep, possesses great strength, is durable and eliminates the possibility of punctures, stone bruises, and blowouts prevalent in the present pneumatic tires. The tire of this invention provides a resilient and yielding contact with the road and a maximum of riding comfort and safety for occupants of the vehicle. It is readily adaptable for use on vehicle wheels of all types used not only on vehicles of relatively light weight but on heavy vehicles such as trucks, tractors and the like. The present invention provides a tire which may be constructed with a minimum of rubber or no rubber if so desired.

The invention will be understood from the following description when considered in connection with the accompanying drawings forming a part thereof and in which:

Fig. 1 is a transverse sectional view of the tire of the present invention taken on the line 1—1 of Fig. 2;

Fig. 2 is a side elevational view of the invention;

Fig. 3 is a side elevational view of the present invention mounted on a wheel;

Fig. 4 is a transverse sectional view of another form of the invention;

Fig. 5 is a transverse sectional view of a further form of the present invention taken on the line 5—5 of Fig. 6;

Fig. 6 is a side elevation of the embodiment shown in Fig. 5 and

Fig. 7 is a still further form of the tire of this invention.

Like characters of reference refer to like parts throughout the several views.

Referring to Figs. 1 and 2 of the drawings the tire of this invention comprises an inner annular member 10 having channel 11 therein and flanges 12 and 13 extending outwardly from the channel on opposite sides and at the top thereof. Annular metallic side walls 14 and 15 extend radially outwardly, respectively, from the flanges 12 and 13 and are secured at the inner edge thereof by welding or other desirable means which will form a fluid tight seal.

The side walls 14 and 15 of the tire are composed of an annular sheet of metal formed to provide a series of reversely bent, superimposed, spaced, annular leaves 16 the adjacent ends of which are connected to form integral flexible hinges that resemble close folds. The inner leaf of each wall is welded or otherwise securely fastened to the flanges 12 and 13 to form a fluid-tight seal while the outer leaf of each wall is likewise secured to an annular bridge plate 17, thereby forming an inner fluid-tight chamber 18. A fluid, preferably air, is admitted to the chamber 18 through a valve stem 19 having a valve therein, not shown, adapted to permit air under pressure to enter the chamber but to prevent the escape of the air therefrom. An annular piece 20 of resilient material, arcuate shaped in cross-section, such as rubber or a similar substance is secured to the bridge plate 17 and extends circumferentially thereof. The piece 20 preferably has a tread 21 therein. The side walls 14, 15 and the resilient piece 20 are so formed that the tire is substantially circular in cross-section.

The tire of the present invention is inflated by admitting air into the chamber 18 through the valve stem 19 until the desired pressure within the tire is attained. Since the side walls 14 and 15 are resilient and the air within the tire compressible, a resilient and yielding contact between the wheel of the vehicle and the road is obtained through the tire of this invention. Should it be desired, however, to dispense with air within the tire, the side walls 14 and 15 of the tire could be made of a metal of greater thickness so that there would be less flexibility in the side wall structure.

While the annular member 10 has been described as having a channel with flanges extending outwardly on opposite sides thereof, the said member may be shaped in any desired manner to fit the rim or wheel construction with which the tire is to be used. The tire of this invention is, therefore, adaptable for use with standard wheel and rim constructions. For example, in Fig. 3 the tire is shown mounted on a detachable rim 22, which may be detachably mounted on a wheel 23 by lugs 24. A section of the rim 22 which is of the usual split-rim construction is shown in Fig. 4 the rim and member 10 being secured together by screws 25.

A form of the invention wherein the tire may be mounted directly on the wheel without the use of a rim is illustrated in Figs. 5 and 6. In this form of the invention the inner periphery of each of the side walls 14 and 15 is formed of a plurality of circumferential sections 26 spaced from one another at 27, each of the circumferential sections comprising a plurality of leaves 16' similar to the leaves 16 hereinbefore described. The sections 26 are welded to the bottom leaf 16 of the side walls at 28. If so desired, instead of forming the inner periphery of each wall in separate sections a plurality of circumferentially spaced cuts extending radially toward the outer periphery may be made in each of the side walls, the cuts extending through several of the leaves 16, thereby providing spaces similar to the spaces 27 and dividing the inner periphery of the side walls of the tire into a plurality of circumferentially spaced sections.

The bottom leaf 16' of the section 26 is welded or otherwise secured to a plurality of arcuate segments 29 each of which is coextensive with the section 26 to which it is secured. The outer side surface 30 of the segments 29 is inclined inwardly. A fluid-tight chamber 31 is formed between the side walls 14 and 15 by means of an annular sheet 32 of resilient metal which extends therebetween and is reversely bent to form superimposed, spaced annular leaves 33 forming integral hinges that resemble close folds. The opposite sides of the sheet 32 are secured to the bottom leaf 16 of the side walls 14 and 15 respectively in fluid-tight relationship thereto. As in the form of the invention shown in Fig. 1 an annular bridge plate 17 is secured to the outer leaf 16 of the side walls in fluid-tight relationship thereto to which plate an annular piece 20 of resilient material is secured. A valve stem 34 is secured in fluid-tight relationship to the sheet 32 and is in communication with the chamber 31.

In mounting the tire of the form of the invention illustrated in Figs. 5 and 6 on the rim 35 of the wheel, the leaves 16' are compressed by applying pressure by any desirable tool on the segments 29 until the inner periphery of the tire is of greater diameter than the outside diameter of the flanges 36 on opposite sides of the rim 35 of the wheel. The tire may then be easily placed on the wheel, the pressure on the segments 29 will be forced by the pressure between the leaves 16' into contact with the outer periphery 37 of the channel formed in the rim 35 between the flanges 36 on opposite sides thereof. Inclined surfaces 38 extend between the inner periphery 37 of the channel and the flanges 36 which surfaces have substantially the same angle of inclination as the surfaces 30. With the construction of this form of the invention, fluid under pressure in the chamber 31 tends to expand the side walls 14 and 15 compressing the leaves 16' of the segments 29 and thereby forcing the segments into contact with the periphery 37 of the channels while at the same time the fluid pressure in the chamber 31 causes the sheet 32 to expand forcing the side walls 14 and 15 apart and causing the inclined surfaces 30 of the segments 29 to engage the inclined surfaces 38 of the wheel rim 35. The tire is thus held tight upon the rim 35.

In the form of the invention shown in Fig. 7, an annular sheet 39 of resilient metal which sheet is arcuate shaped in transverse cross-section is fastened in fluid-tight relationship to the inner annular member 10. One end of the sheet 39 is welded or otherwise secured at 40 in fluid-tight relationship to the flange 12 while the opposite end of the sheet 39 is secured in a like manner at 41 to the flange 13. A fluid-tight chamber 42 is thereby formed between the sheet 39 and the member 10. The sheet 39 is composed of resilient metal formed to provide a series of reversely bent, superimposed, spaced, annular leaves 43 the adjacent ends of which are connected to form integral hinges that resemble close folds. Positioned over the sheet 39 is an annular piece of resilient material 20, arcuate-shaped in cross-section. Air under pressure is admitted to the chamber 42 through a valve stem 44. For purposes of illustration the tire is shown mounted on the rim 22, hereinbefore fully described.

While the side walls 14 and 15 have been described as being formed of a single strip of resilient metal formed to provide a series of reversely bent, superimposed, spaced, annular leaves the adjacent ends of which are connected, the side walls 14 and 15 may be formed of separate leaves 16 having a reverse curve therein extending transversely thereof, as shown in Figs. 4 and 5 of the drawings. The opposite ends of each leaf 16 is welded to the adjoining end of the adjacent leaf 16. The side walls 14 and 15 may be constructed of a plurality of radial sections, welded together, instead of a single sheet of material, if so desired. Sheet 43 of Fig. 7 and sheet 32 of Fig. 5 may also be so constructed.

While the tire of the present invention has been set forth and described as being inflated by means of air under pressure, it will be understood that said tire may be so constructed that inflation by means of air pressure is not necessary. By decreasing the resilience of the side walls 14 and 15, for example, by using a metal of relatively greater thickness and having less flexibility therein sufficient resiliency to obtain a yielding contact with the road may be provided without the use of air under pressure within the tire.

Since changes may be effected in the forms of the invention selected for disclosure without departing from the principles of the invention, it will be understood that the invention is not to be limited except by the scope of the appended claims.

What is claimed is:

1. A tire for a wheel, said tire having a flexible body portion comprising a plurality of annular leaves of flexible material, superimposed in spaced relationship to one another, said leaves being reversely bent transversely thereof, each leaf being connected adjacent opposite edges thereof to the leaf adjacent the opposite sides thereof, thereby forming a plurality of flexible hinges.

2. A tire for a wheel, said tire having an outer peripheral member and an inner peripheral member, resilient means extending between said outer and inner peripheral members comprising a plurality of annular leaves of resilient metallic material, superimposed in spaced relationship to one another, said leaves being reversely bent transversely thereof, each leaf being connected in a fluid-tight relationship adjacent opposite edges thereof to the leaf adjacent the opposite sides thereof, thereby forming a plurality of flexible hinges, said resilient means being so disposed as to form a fluid-tight chamber between said peripheral surfaces, and means whereby fluid under pressure may be admitted to said chamber to inflate said resilient means.

3. A tire for a wheel, said tire having an outer peripheral member of resilient material and an inner peripheral member, resilient means extending between said outer and inner peripheral members comprising a plurality of annular leaves of resilient metallic material, superimposed in spaced relationship to one another, said leaves being reversely bent transversely thereof, each leaf being connected in a fluid-tight relationship adjacent opposite edges thereof to the leaf adjacent the opposite sides thereof, thereby forming a plurality of flexible hinges, said resilient means being so disposed as to form a fluid-tight chamber between said peripheral surfaces, and means whereby fluid under pressure may be admitted to said chamber to inflate said resilient means.

4. A tire for a wheel, said tire having a flexible body portion comprising resilient side walls laterally spaced from one another, said side walls each comprising a plurality of annular leaves of resilient metallic material, superimposed in spaced relationship to one another, said leaves being reversely bent transversely thereof, each leaf being connected adjacent opposite edges thereof to the leaf adjacent the opposite sides thereof, thereby forming a plurality of flexible hinges.

5. A tire for a wheel, said tire having a flexible body portion comprising an outer peripheral member and an inner peripheral member, laterally spaced walls extending between said members, each wall comprising a plurality of annular leaves of resilient metallic material, superimposed in spaced relationship to one another, said leaves being reversely bent transversely thereof, each leaf being connected adjacent opposite edges thereof to the leaf adjacent the opposite sides thereof, thereby forming a plurality of flexible hinges extending between said members.

6. A tire for a wheel, said tire having a flexible body portion comprising an outer peripheral member and an inner peripheral member, laterally spaced side walls extending between said members, each of said side walls comprising a plurality of annular leaves of flexible material, superimposed in spaced relationship to one another, said leaves being reversely bent transversely thereof, each leaf being connected adjacent opposite edges thereof to the leaf adjacent the opposite sides thereof, thereby forming a plurality of flexible hinges extending between said members.

7. A tire for a wheel, said tire having a flexible body portion comprising an outer peripheral member and an inner peripheral member, laterally spaced side walls each connected to said members in fluid-tight relationship to form a fluid-tight chamber therebetween, said side walls comprising a plurality of annular leaves of flexible material, superimposed in spaced relationship to one another, said leaves being reversely bent transversely thereof, each leaf being connected in a fluid-tight relationship adjacent opposite edges thereof to the leaf adjacent the opposite sides thereof, thereby forming a plurality of flexible hinges extending between said members, and means whereby fluid under pressure may be admitted to said chamber to inflate said tire.

8. A tire for a wheel comprising a flexible body portion said body portion having a plurality of annular leaves of flexible material superimposed in spaced relationship to one another, each connected adjacent opposite edges thereof to the leaf adjacent the opposite sides thereof, said leaves being reversely bent transversely thereof, thereby forming a plurality of flexible hinges, said body portion being arcuate shaped in transverse cross-section and adapted to extend from one side of the wheel to the opposite side thereof, and an outer peripheral member secured to the outer side of said body portion.

9. A tire for a wheel comprising an inner rim, a flexible body portion, said body portion comprising a plurality of annular leaves of flexible material superimposed in spaced relationship to one another, each connected adjacent opposite edges thereof to the leaf adjacent the opposite sides thereof, said leaves being reversely bent transversely thereof, thereby forming a plurality of flexible hinges, said body portion being arcuate shaped in transverse cross-section, the opposite ends of said body portion being secured to said rim, and an outer peripheral member secured to the outer side of said body portion.

10. A tire for a wheel comprising an inner rim, a flexible body portion said body portion comprising a plurality of annular leaves of flexible material superimposed in spaced relationship to one another, each connected in a fluid-tight manner adjacent opposite edges thereof to the leaf adjacent the opposite sides thereof, said leaves being reversely bent transversely thereof, thereby forming a plurality of flexible hinges, said body portion being arcuate shaped in transverse cross-section the opposite ends of said body portion being secured to said rim in a fluid-tight manner thereby forming a fluid-tight chamber between said body portion and said rim, means whereby fluid under pressure may be admitted to said chamber to inflate said tire, and an outer peripheral member secured to the outer side of said body portion.

11. A tire for a wheel, said tire having a flexible body portion comprising an outer peripheral member, laterally spaced side walls, each connected at one end thereof to said outer member in fluid-tight relationship, said side walls comprising a plurality of annular leaves of flexible material, superimposed in spaced relationship to one another, each leaf being connected in a fluid-tight relationship adjacent opposite edges thereof to the leaf adjacent the opposite sides thereby forming a plurality of flexible hinges, a plurality of arcuate shaped segments circumferentially spaced one from another and secured in a fluid-tight manner to the opposite end of each of said side walls, an inner wall extending between said side walls and secured in fluid-tight relationship to said walls intermediate the opposite ends of the walls to form a fluid-tight chamber between said inner wall and the outer peripheral member, said inner wall comprising a plurality of annular leaves of flexible material, superimposed in spaced relationship to one another, each leaf being connected in a fluid-tight relationship adjacent opposite edges thereof to the leaf adjacent the opposite sides, thereby forming a plurality of flexible hinges extending between said walls, and means whereby fluid under pressure may be admitted to said chamber to inflate said tire.

12. A tire for a wheel, said tire having a flexible body portion comprising an outer peripheral member, laterally spaced side walls, each connected at one end thereof to said outer member, said side walls comprising a plurality of annular leaves of metallic material superimposed in spaced relationship to one another, said leaves being reversely bent transversely thereof, each leaf being connected adjacent opposite edges thereof to the leaf adjacent the opposite sides thereof thereby forming a plurality of flexible hinges, a plurality of arcuate-shaped segments circumferentially spaced from one another and secured to the end of each of said side walls opposite said one end, and a flexible inner wall extending between said side walls and secured thereto intermediate the opposite ends of the walls to form a chamber between said inner wall and the outer peripheral member.

13. A tire for a wheel, said tire having a flexible body portion comprising an outer peripheral member, laterally spaced side walls each connected at one end thereof to said outer member in fluid-tight relationship, said side walls comprising a plurality of annular leaves of metallic material superimposed in spaced relationship to one another, said leaves being reversely bent transversely thereof, each leaf being connected in a fluid-tight relationship adjacent opposite edges thereof to the leaf adjacent the opposite sides thereof, thereby forming a plurality of flexible hinges, a plurality of arcuate-shaped segments circumferentially spaced from one another and secured in a fluid-tight manner to the end of each of said side walls opposite said one end, an inner wall extending between said side walls and secured in fluid-tight relationship to said walls intermediate the opposite ends of the walls to form a fluid-tight chamber between said inner wall and the outer peripheral member, said inner wall comprising a plurality of annular leaves of resilient metallic material superimposed in spaced relationship to one another, said leaves being reversely bent transversely thereof, each leaf being connected in a fluid-tight relationship adjacent opposite edges thereof to the leaf adjacent the opposite sides thereof, thereby forming a plurality of flexible hinges extending between said walls, and means whereby fluid under pressure may be admitted to said chamber to inflate said tire.

14. A tire for a wheel, said tire having a flexible body portion comprising an outer peripheral member, laterally spaced side walls, each connected at one end thereof to said outer member, said side walls comprising a plurality of annular leaves of flexible material superimposed in spaced relationship to one another, each leaf being connected adjacent opposite edges thereof to the leaf adjacent the opposite sides thereof thereby forming a plurality of flexible hinges, a plurality of said leaves being circumferentially spaced at the end of the side walls opposite said one end, and a plurality of arcuate shaped segments circumferentially spaced one from another and secured to the end of each of said side walls opposite to said one end.

15. A tire for a wheel, said tire having a flexible body portion comprising an outer peripheral member, laterally spaced side walls, each connected at one end thereof to said outer member, said side walls comprising a plurality of annular leaves of flexible material superimposed in spaced relationship to one another, said leaves being reversely bent transversely thereof, each leaf being connected adjacent opposite edges thereof to the leaf adjacent the opposite sides thereof thereby forming a plurality of flexible hinges, a plurality of said leaves being circumferentially spaced at the end of the side walls opposite said one end, and a plurality of arcuate shaped segments circumferentially spaced one from another and secured to the end of each of said side walls opposite to said one end.

16. A tire for a wheel, said tire having a flexible body portion comprising resilient side walls laterally spaced from one another, each side wall comprising an annular sheet of resilient metallic material reversely bent upon itself to form a plurality of superimposed, spaced, annular leaves providing a plurality of flexible hinges, said leaves being reversely bent transversely thereof.

17. A tire for a wheel, said tire having a flexible body portion comprising an outer peripheral member, laterally spaced side walls each connected at one end thereof to said outer member in fluid-tight relationship, said side walls comprising a plurality of annular leaves of flexible material superimposed in spaced relationship to one another, each leaf being connected in fluid-tight relationship adjacent opposite edges thereof to the leaf adjacent the opposite sides thereby forming a plurality of flexible hinges, a plurality of said leaves being circumferentially spaced at the end of the side walls opposite said one end, a plurality of arcuate-shaped segments connected to said circumferentially spaced leaves, an inner wall extending between said side walls and secured thereto intermediate the opposite ends of the side walls in fluid-tight relationship to form a fluid-tight chamber between said side walls, inner wall and the outer peripheral member, said inner wall comprising a plurality of annular leaves of flexible material, superimposed in spaced relationship to one another, each leaf being connected in fluid-tight relationship adjacent opposite edges thereof to the leaf adjacent the opposite sides thereby forming a plurality of flexible hinges extending between said walls, and means whereby fluid under pressure may be admitted to said chamber to inflate said tire.

18. A tire for a wheel, said tire having a flexible body portion comprising an outer peripheral member, laterally spaced side walls each connected at one end thereof to said outer member in fluid-tight relationship, said side walls comprising a plurality of annular leaves of flexible material superimposed in spaced relationship to one another, each leaf being connected in fluid-tight relationship adjacent opposite edges thereof to the leaf adjacent the opposite sides thereby forming a plurality of flexible hinges, a plurality of said leaves being circumferentially spaced at the end of the side walls opposite said one end, a plurality of arcuate-shaped segments connected to said circumferentially spaced leaves, an inner wall extending between said side walls and secured thereto intermediate the opposite ends of the side walls in fluid-tight relationship to form a fluid-tight chamber between said side walls, inner wall and the outer peripheral member, and means whereby fluid under pressure may be admitted to said chamber to inflate said tire.

THOMAS J. HOY.